3,093,856
WINDSCREEN WIPERS
Phillip Geoffrey Kent Smithers, London, England, assignor to Trico Products Corporation, Buffalo, N.Y., a corporation of New York
Filed July 1, 1960, Ser. No. 40,292
3 Claims. (Cl. 15—250.42)

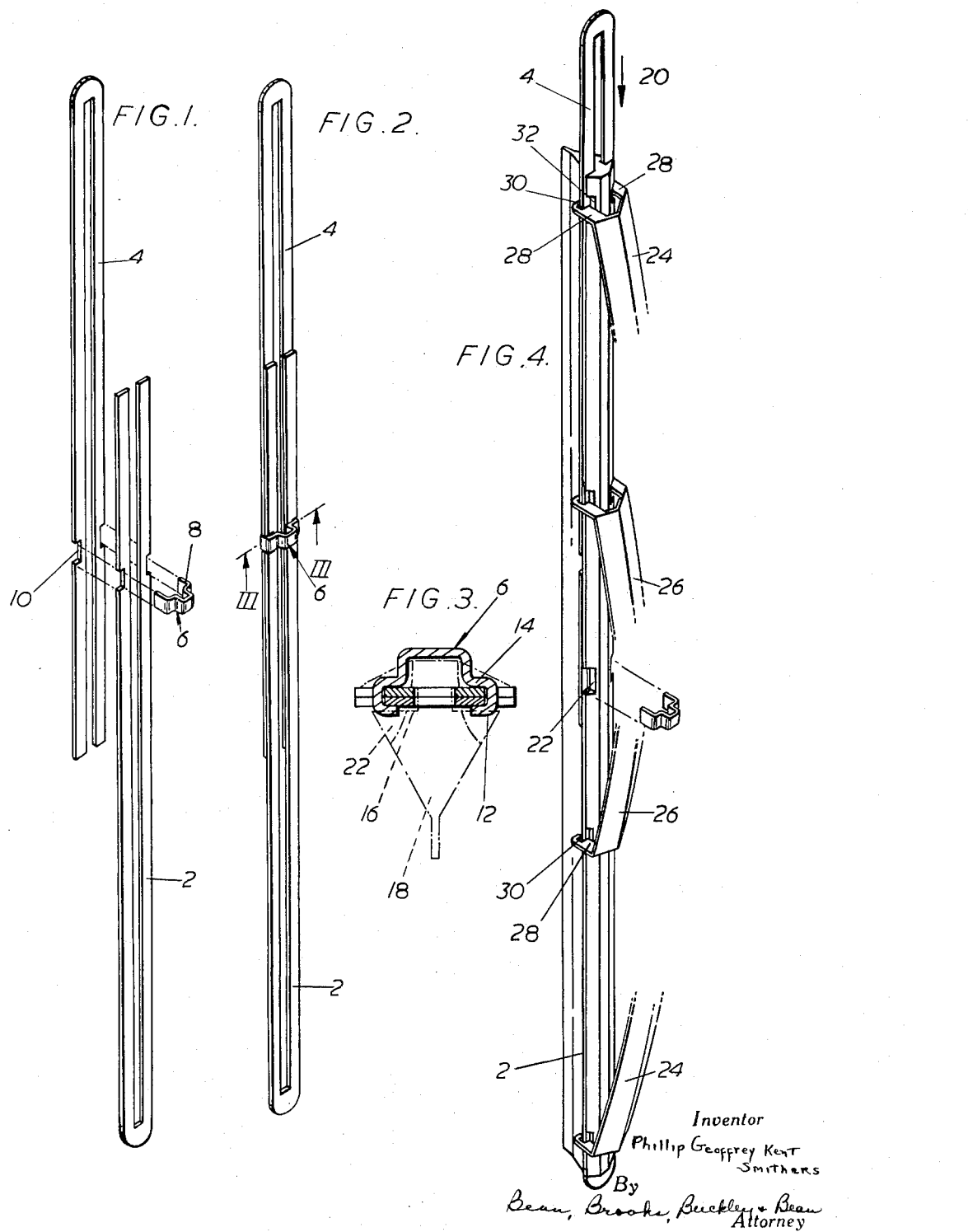

Wiper blades for use on curved windscreens commonly consist of a flexible wiping element, known as the "rubber," and a backing strip. The backing strip is flexible to and from the screen but substantially inflexible parallel to the screen. A harness of yokes or levers distributes pressure from a wiper arm to several points on the backing strip, which in turn distributes the pressure over the length of the rubber.

In order to distribute pressure, and not simply transmit pressure to the rubber solely at the points of connection with the harness, the backing strip must have a certain stiffness. This leads to difficulty, because the curvature of screens is commonly gentle in the centre, and abrupt at the part covered by the outer end of the wiper at the outer end of its stroke. If, as is usual, the backing strip is of uniform stiffness throughout, then the rubber, when at the outer end of its stroke, tends to lose contact with the screen at a point a little outboard from the centre of the rubber and also at the extreme outer end.

According to the present invention a backing strip is made in two pieces, one extending outwards from the inner end of the rubber, and the other extending inwards from the outer end of the rubber, the two pieces overlapping near the centre of the length of the rubber. Thus the flexibility of the blade is graduated along its length.

The position and extent of the overlap can be chosen to suit a particular configuration of screen. Preferably in the overlap the piece nearer the screen is the outer piece.

The two pieces may be of thinner material than a usual backing strip.

In the common arrangement in which the rubber has two grooves and the backing strip is essentially two parallel strips lying in the grooves and bridged together, the two pieces may be hairpin-shaped in plan, and prevented from spreading out of the grooves in the central part of the length of the rubber by enclosure by claws on the harness or by one or more clips which bridge across the backing strip.

The accompanying drawings show one example of a wiper blade according to the present invention. In these drawings:

FIGURE 1 shows the two separate pieces of the backing strip and the clip, before assembly;

FIGURE 2 shows the relative positions of the two pieces of the clip after assembly;

FIGURE 3 is the section on an enlarged scale on the line III—III in FIGURE 2, with the outline of the rubber shown in broken lines; and FIGURE 4 is a view showing the way in which the backing strip is assembled with the rubber and harness.

The backing strip consists of two pieces 2 and 4 each of which is hairpin-shaped in plan. When the backing strip is assembled, the two pieces are held together by a clip 6 which initially has a shape shown in FIGURE 1 and which includes two limbs 8 which seat in notches 10 in the sides of the base and the tips of which are then bent over at 12 as shown in FIGURE 3 so that the two pieces 2 and 4 are clamped together between the tips 12 and shoulders 14 forming part of the clip 6.

In the final assembly, the backing strip lies in two grooves 16 in the sides of the rubber 18. Consequently it is necessary for the two pieces to be slid on to the rubber from opposite ends. In FIGURE 4 the piece 2 is shown in final position and the piece 4 is shown in the course of being assembled, by movement in the direction indicated by the arrow 20. It is only when the two pieces are fully assembled that the notches 10 come into register, and then the clip 3 is applied. There are recesses 22 in the rubber to accommodate the clip.

The harness which distributes pressure to the blade from a wiper arm, not shown, consists of two levers 24 which engage the backing strip at its ends, and a central yoke 26 which engages the backing strip at two intermediate points. The extent of overlap of the pieces of the backing strip is from one of the intermediate points to the other. The connection between the harness and the backing strip are by means of pairs of tongues 28, in the inner edges of which are notches 30 which engage the outer edges of the backing strip. There are recesses 32 in the rubber to accommodate the tongues 28. It will be apparent that the harness must be placed in the correct position relative to the rubber before the two pieces of the backing strip are slid into place.

I claim:
1. A wiper blade consisting of a rubber and a backing strip made in two pieces, one extending outwards from the inner end of the rubber, and the other extending inwards from the outer end of the rubber, the two pieces overlapping near the center of the length of rubber, a pressure distributing harness, means on said harness for engaging the backing strip at its ends and at two intermediate points, said backing strip pieces overlapping from one of said intermediate points to the other.

2. A wiper blade comprising an elongate rubber having a pair of longitudinal grooves extending for the entire length of said elongate rubber, one of said grooves disposed on each side of said rubber, a backing strip comprising a pair of surface conforming U-shaped members, said U-shaped members each having a leg disposed in each of said grooves and each U-shaped member having its web portion disposed at opposite ends of said rubber, said leg members overlapping in each of said grooves in an intermediate portion thereof and means engaging said backing strip at a plurality of longitudinally spaced points in said intermediate portion.

3. A wiper blade according to claim 2 wherein said engaging means are interlockingly secured to said backing strip pieces.

References Cited in the file of this patent
UNITED STATES PATENTS

| | | |
|---|---|---|
| 2,596,063 | Anderson | May 6, 1952 |
| 2,663,043 | Oishei | Dec. 22, 1953 |
| 2,905,961 | Oishei et al. | Sept. 29, 1959 |

FOREIGN PATENTS

| | | |
|---|---|---|
| 619,320 | Great Britain | Mar. 8, 1949 |
| 803,354 | Great Britain | Oct. 22, 1958 |
| 1,028,896 | Germany | Apr. 24, 1958 |
| 1,045,263 | Germany | Nov. 27, 1958 |